(12) United States Patent  (10) Patent No.: US 7,876,552 B2
Guo  (45) Date of Patent: Jan. 25, 2011

(54) SUPPORT STRUCTURE FOR DISPLAY DEVICE AND DISPLAY DEVICE USING SAME

(75) Inventor: Xin Guo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 175 days.

(21) Appl. No.: 12/409,513

(22) Filed: Mar. 24, 2009

(65) Prior Publication Data

US 2010/0157513 A1 Jun. 24, 2010

(30) Foreign Application Priority Data

Dec. 23, 2008 (CN) .................. 2008 1 0306473

(51) Int. Cl.
 *G06F 1/16* (2006.01)
(52) U.S. Cl. .................. 361/679.07; 361/679.02; 361/679.21; 361/679.29; 248/917; 248/922
(58) Field of Classification Search ............ 361/679.05, 361/679.07
 See application file for complete search history.

(56) References Cited

U.S. PATENT DOCUMENTS 6,758,454 B2 * 7/2004 Smed .................. 248/314
7,178,774 B2 * 2/2007 Kim .................. 248/279.1
7,764,491 B2 * 7/2010 Zhao et al. ............ 361/679.22
2004/0079849 A1 * 4/2004 Rudolf .................. 248/276.1
2005/0088812 A1 * 4/2005 Hillman et al. ............ 361/683
2005/0236533 A1 * 10/2005 McRight et al. ............ 248/161
2008/0165481 A1 * 7/2008 Kirschner et al. ........... 361/681

* cited by examiner

*Primary Examiner*—Jayprakash N Gandhi
*Assistant Examiner*—Anthony Q Edwards
(74) *Attorney, Agent, or Firm*—Frank R. Niranjan

(57) ABSTRACT

A support structure for supporting a display panel includes a rotatable base, a first supporting assembly, a second supporting assembly, and a connecting portion. The first supporting assembly includes a first sleeve and a first connector moveably coupled to the first sleeve along a first direction. The first sleeve is fixed to the rotatable base. The second supporting assembly includes a second sleeve and a second connector moveably coupled to the second sleeve along a second direction. The second direction is perpendicular to the first direction. The second connector is slidably coupled to the display panel along a third direction. The third direction is perpendicular to a plane cooperatively defined by the first direction and the second direction. The connecting portion fixedly connects the first connector to the second sleeve. A display panel using the support structure is also provided.

20 Claims, 9 Drawing Sheets

SUPPORT STRUCTURE FOR DISPLAY DEVICE AND DISPLAY DEVICE USING SAME

BACKGROUND

1. Technical Field

The present disclosure relates to support structures and, particularly, to a support structure for a display device and a display device using the same.

2. Description of the Related Art

Generally, display devices, such as a computer monitor, are supported by a support structure that offers limited range of movement on a support surface, such as a desk surface. Orientation or the range of movement of the display devices may be adjusted to meet the viewers' preferences. However, a multi-dimensional adjustment for the display device may not be possible.

Therefore, what is needed is to provide a support structure for a display device and a display device using the same, in which the above problem is eliminated or at least alleviated.

DETAILED DESCRIPTION

Figure 1:
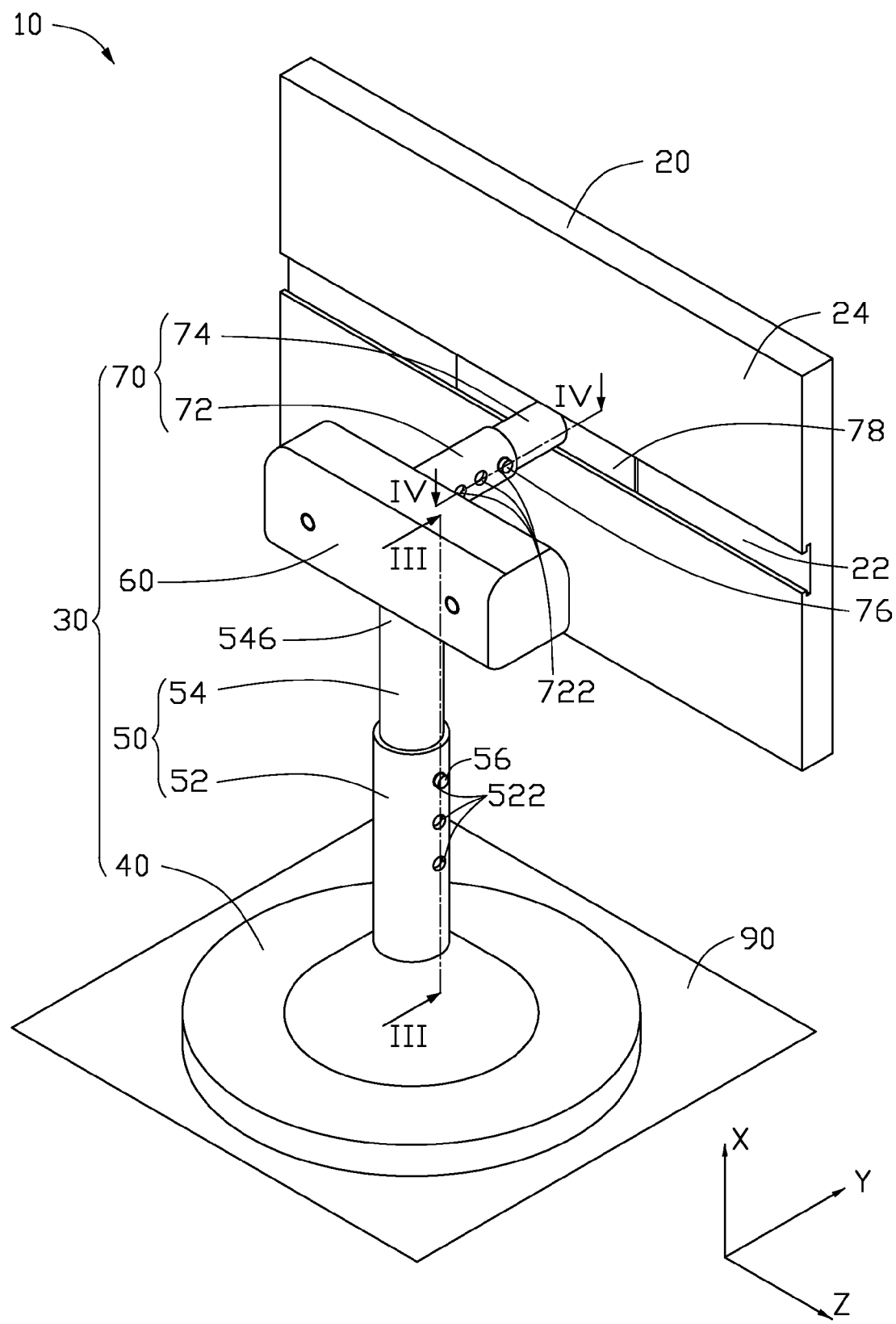
FIG. 1 is an isometric and schematic view of a display device including a support structure and a display panel, according to a first exemplary embodiment.
Figure 2:
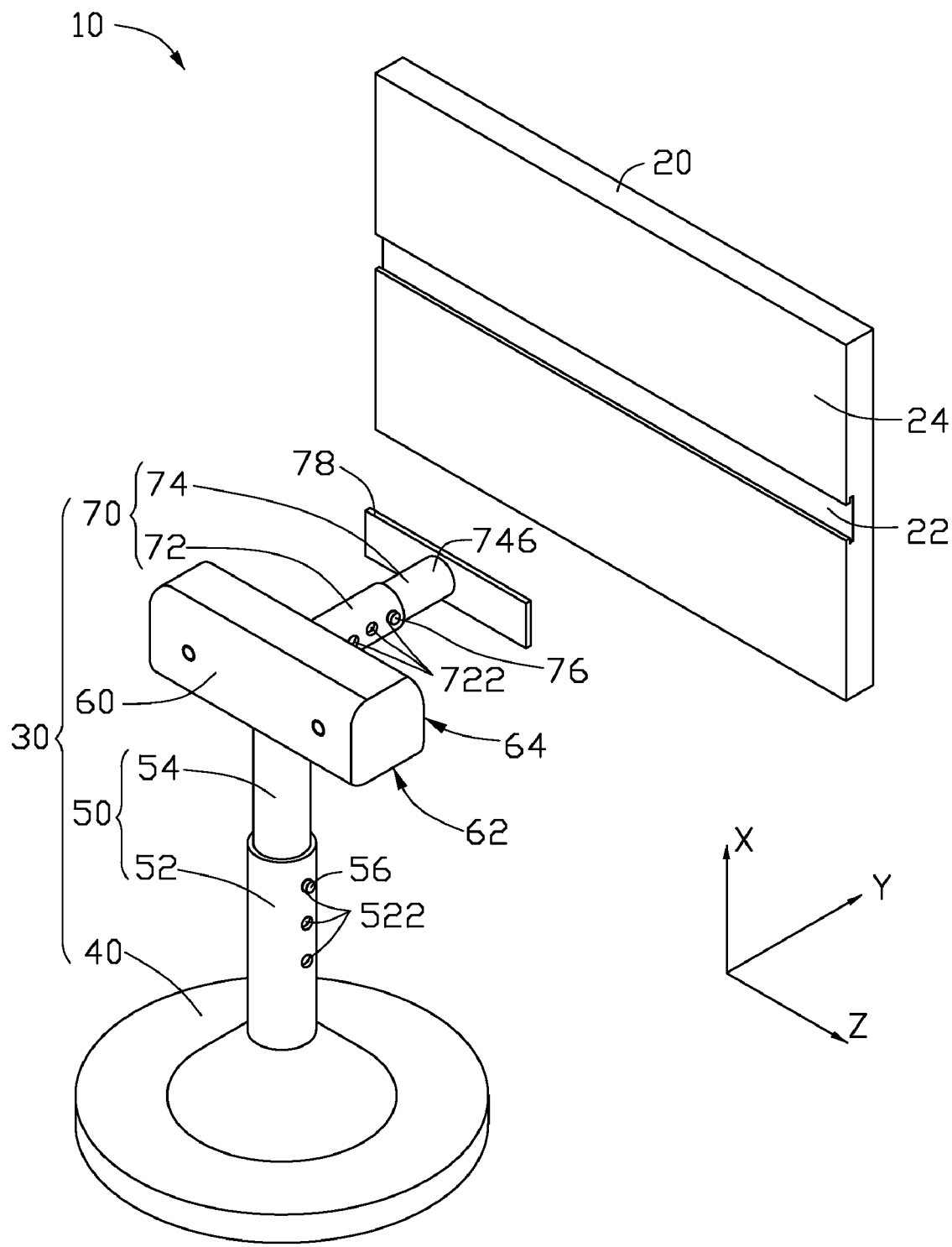
FIG. 2 is similar to FIG. 1, but showing the display panel detached from the support structure.

Referring to FIGS. 1-5, a display device 10 according to a first exemplary embodiment includes a display panel 20 and a support structure 30 for supporting the display panel 20. The display panel 20 may be, but not limited to, a liquid crystal display panel, a light emitting diode display panel, an organic light emitting diode display panel or a plasma display panel. In this embodiment, a T-shaped guiding groove 22 is defined at a rear 24 of the display panel 20.

The support structure 30 includes a rotatable base 40, a first supporting assembly 50, a connecting portion 60, a second supporting assembly 70 and a suction cup 80.

The rotatable base 40 includes a bottom surface 42. A receiving cavity 46 is defined at the bottom surface 42. The suction cup 80 may be made from rubber and includes a body 81 and a rod-shaped positioning portion 82 perpendicularly extending from the body 81. The receiving cavity 46 is defined for rotatably receiving the suction cup 80. Four wheels 442, 444, 446, 448 are installed on the bottom surface 42. The suction cup 80 and the wheels 442, 444, 446, 448 are coplanar so that the rotatable base 40 is rotatably placed on a flat surface 90 while the suction cup 80 is attached to the flat surface 90 and the rotatable base 40 is rotated around the positioning portion 82.

The first supporting assembly 50 includes a first sleeve 52, a first connector 54, a first stopper 56 and an elastic member 58. The first sleeve 52 is integrated with the rotatable base 40. Three first positioning through holes 522 are defined through the first sleeve 52 along a first direction X. The first connector 54 is approximately rod-shaped and is movably coupled to the first sleeve 52 along the first direction X. A first through hole 542 is defined in a distal end 544 of the first connector 54. The distal end 544 is movably received in the first sleeve 52 so that the first through hole 542 can be aligned with one of the three first positioning through holes 522.

The first stopper 56 is rod-shaped, and the length of the first stopper 56 is greater than the outer diameter of the first sleeve 52. The first stopper 56 is extended through the first through hole 542 and one of the first positioning through holes 522 so that the first sleeve 52 can hold the first connector 54. The elastic member 58 is received in the first sleeve 52 and the natural length of the elastic member 58 is greater than the length of the first sleeve 52 so that the elastic member 58 is pressed and abuts against the first connector 54 and a bottom of the first sleeve 52.

The connecting portion 60 includes a bottom surface 62 and a side surface 64 approximately perpendicular to the bottom surface 62. The first connector 54 is fixed to the bottom surface 62 of the connecting portion 60.

The second supporting assembly 70 includes a second sleeve 72, a second connector 74, a second stopper 76, and a guiding member 78. The second sleeve 72 is fixed to the side surface 64 of the connecting portion 60. Three second positioning through holes 722 are defined through the second sleeve 72 along a second direction Y. The second connector 74 is approximately rod-shaped and is movably coupled to the second sleeve 72 along the second direction Y. The second direction Y is perpendicular to the first direction X. A second through hole 742 is defined in a distal end 744 of the second connector 74. The distal end 744 is movably received in the second sleeve 72 so that the second through hole 742 can be aligned with one of the three second positioning through holes 722.

The second stopper 76 is rod-shaped, and the length of the second stopper 76 is greater than the outer diameter of the second sleeve 72. The second stopper 76 is extended through the second through hole 742 and one of the second positioning through holes 722 to make the second connector 74 held by the second sleeve 72. The guiding member 78 is fixed to an end 746 of the second connector 74 opposite to the distal end 744 of the second connector 74. The guiding member 78 is plate-shaped and is slidably received in the guiding groove 22 of the display panel 20 along a third direction Z. The third direction Z is perpendicular to a plane cooperatively defined by the first and second directions X, Y.

When orientation of the display device 10 needs to be adjusted, the rotatable base 40 is manually rotated around the positioning portion 82 and the display panel 20 is manually moved along the third direction Z. Therefore, the display panel 20 can be rotated to meet different viewers' positions. The first supporting assembly 50 is adjusted as follows: the first stopper 56 is pulled out of the through holes 522, 542. The first connector 54 is manually moved in the first sleeve 52 along the first direction X until the first through hole 542 meets another first positioning through hole 522. The first stopper 56 is extended through the first through hole 542 and the another first positioning through hole 522 so that the first connector 54 is held by the first sleeve 52 again. Therefore, a height of the display panel 20 is adjusted. An adjustment of the second supporting assembly 70 is similar to that of the first supporting assembly 50, but the second connector 74 is manually moved in the second sleeve 72 along the second direction Y. Therefore, the distance between the display panel 20 and a viewer is adjusted.

In summary, the display device 10 can achieve a multi-dimensional adjustment.

Figure 3:
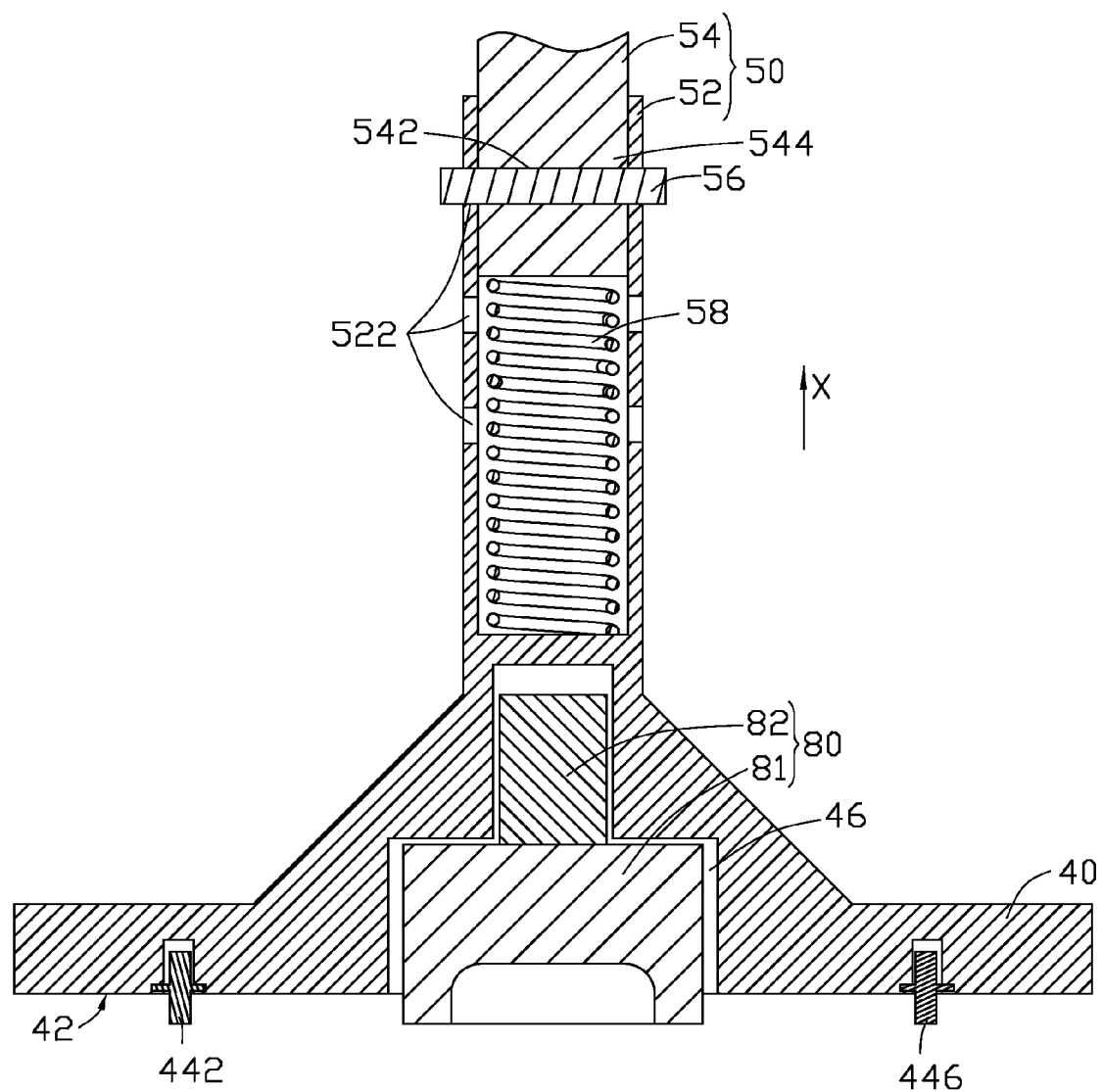
FIG. 3 is a partial cross-sectional view taken along line III-III of FIG. 1.
Figure 4:
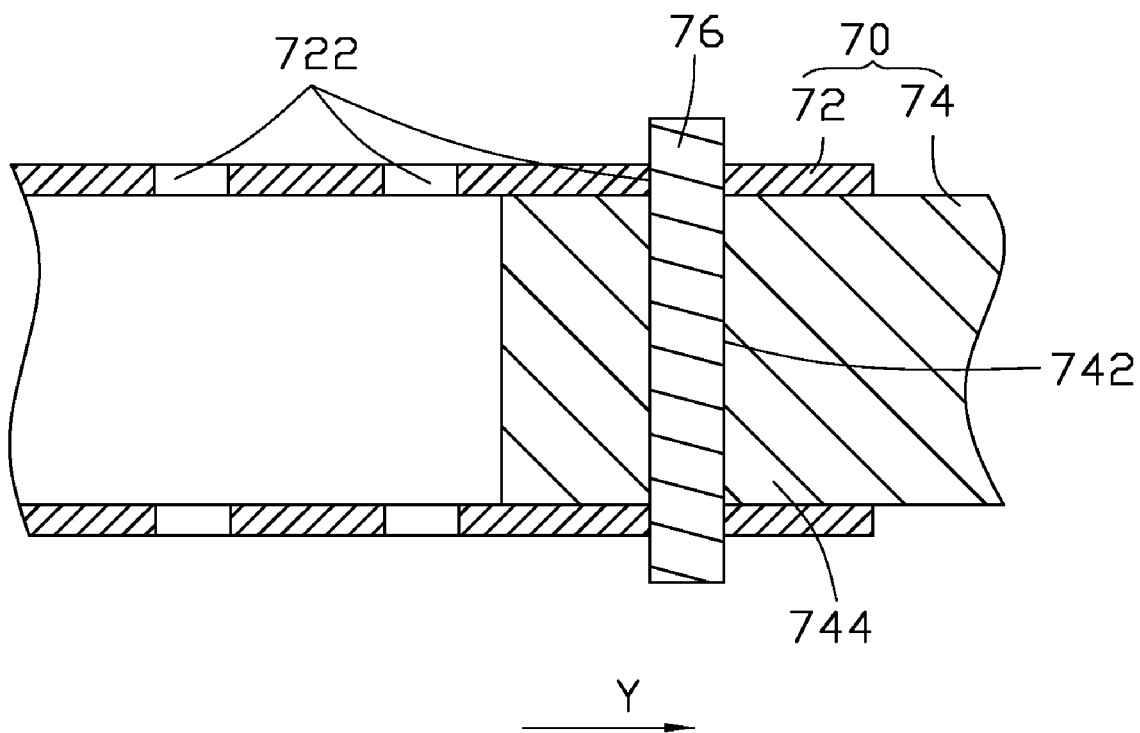
FIG. 4 is a partial cross-sectional view taken along line IV-IV of FIG. 1.
Figure 5:
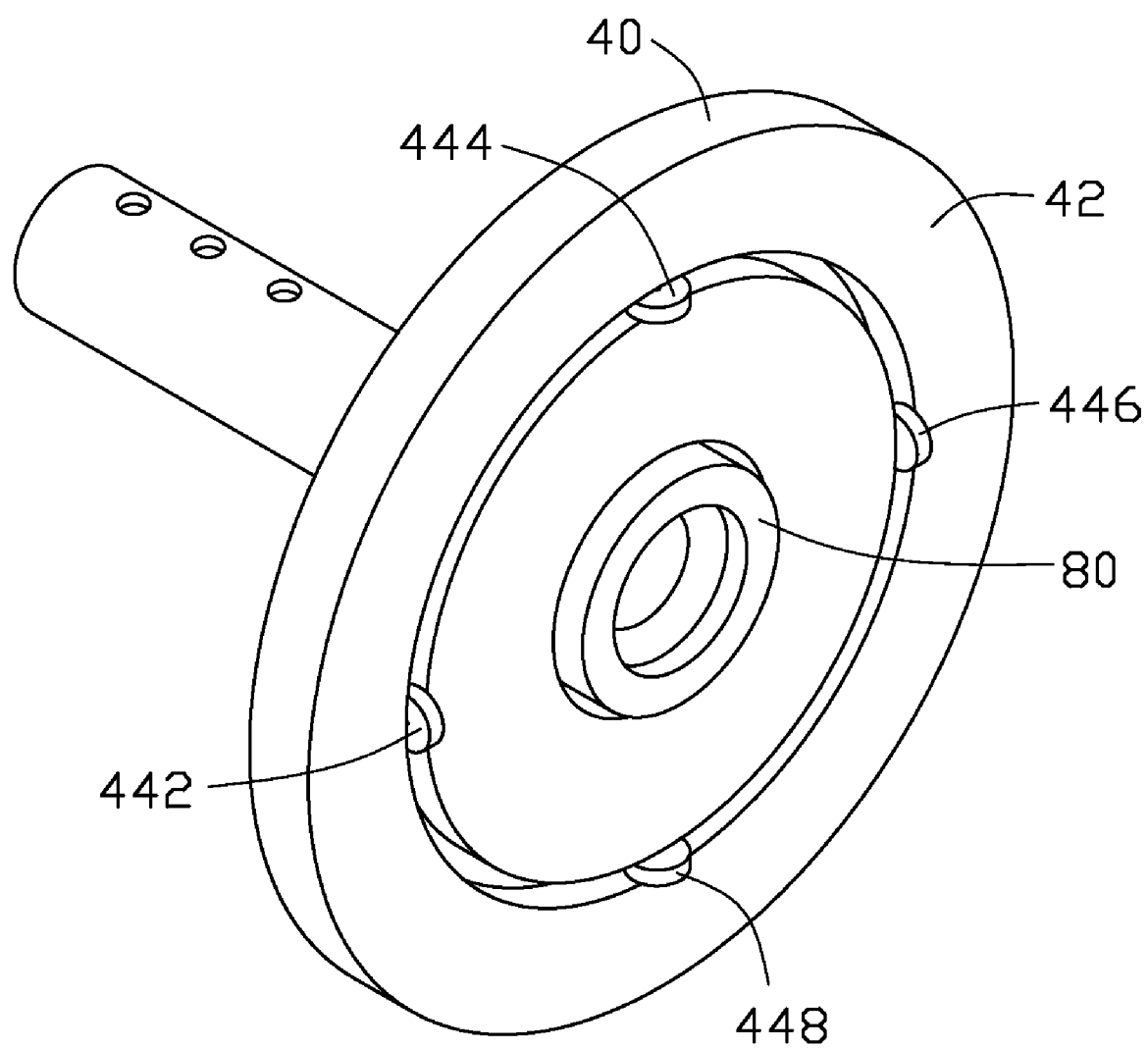
FIG. 5 is an isometric bottom view of a base of the display device of FIG. 1.
Figure 6:
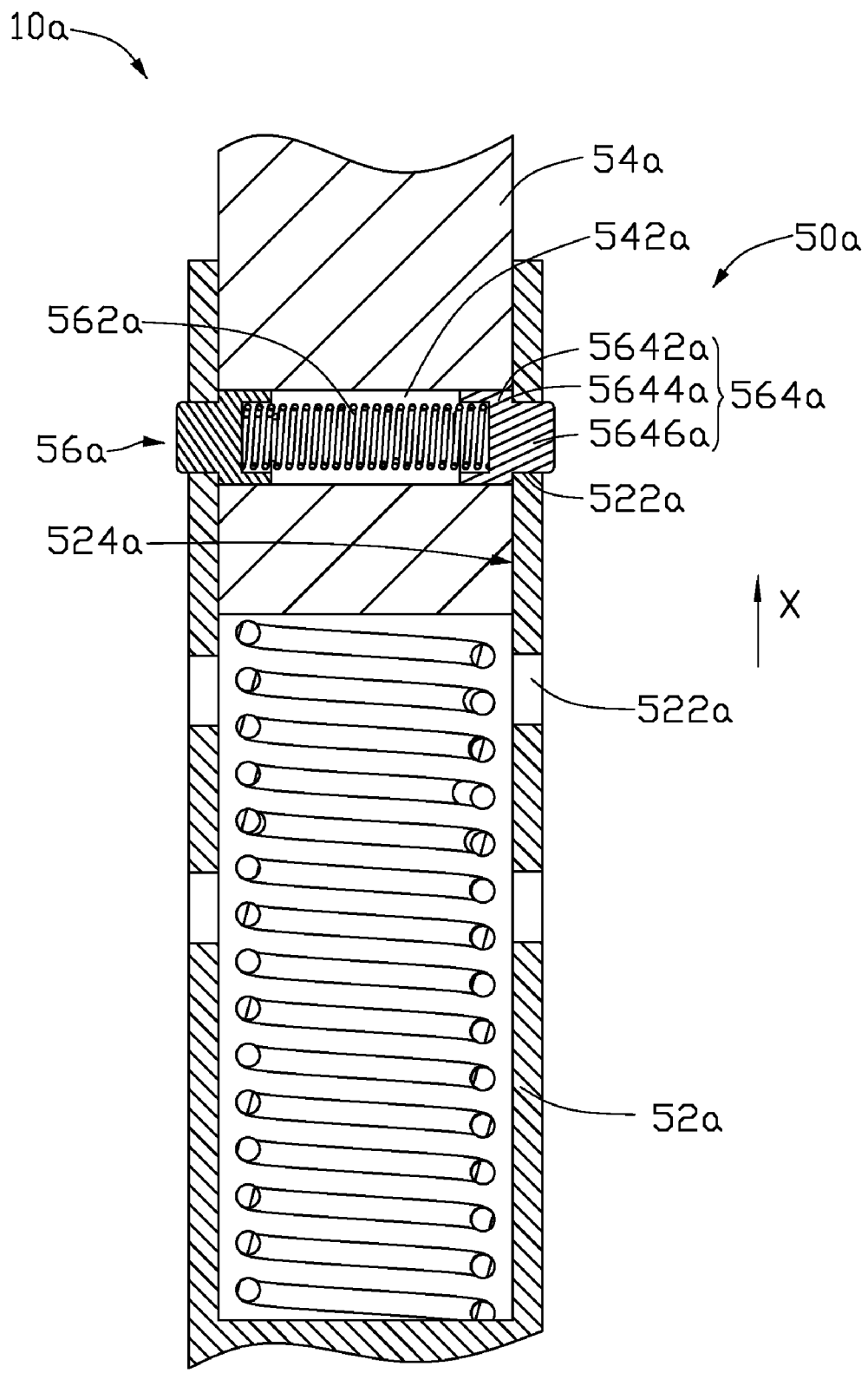
FIG. 6 is a partial cross-sectional view of a support structure of a display device, according to a second exemplary embodiment.
Figure 7:
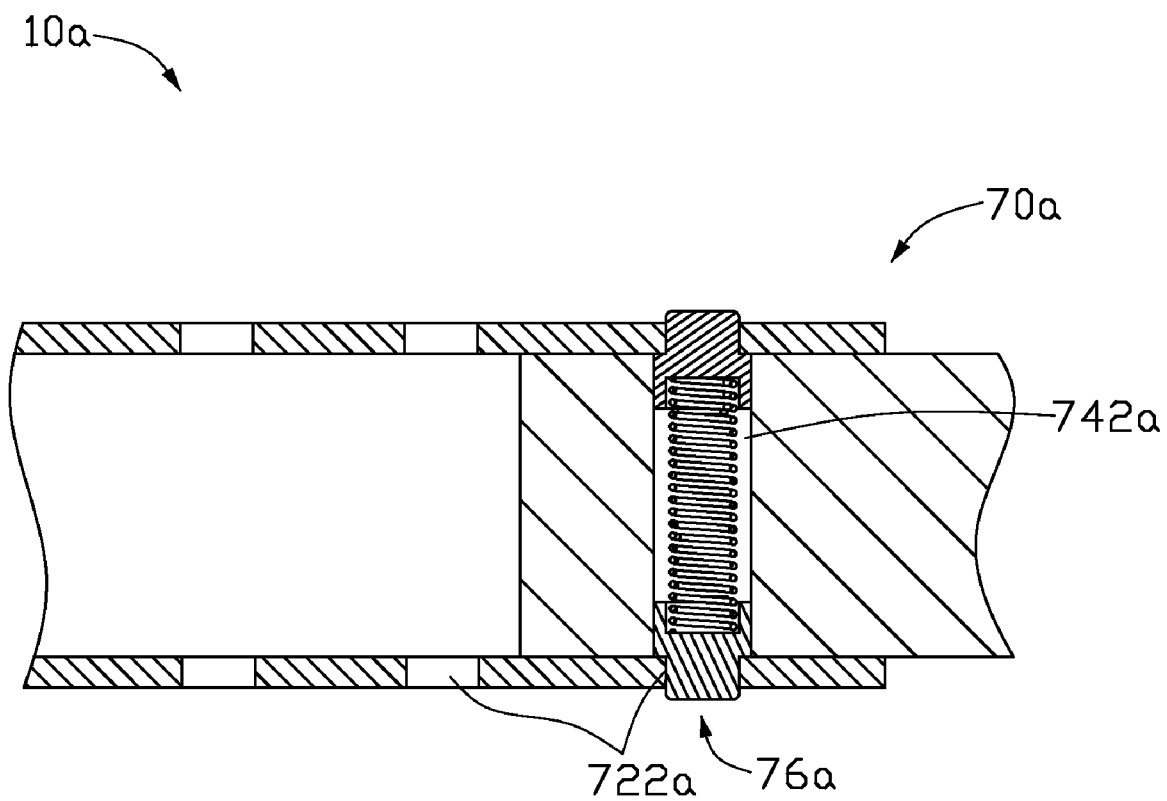
FIG. 7 is another partial cross-sectional view of the support structure of the display device of FIG. 6.

Referring to FIGS. 6-7 together with FIG. 3, a display device 10a according to a second exemplary embodiment is shown. The differences between the display device 10a of this embodiment and the display device 10 are that the first and second stoppers 56a, 76a, and the first and second through holes 542a, 742a are different. The diameter of the first through hole 542a is greater than that of each first positioning through hole 522a. The diameter of the second through hole 742a is greater than that of each second positioning through hole 722a.

The first stopper 56a includes two buttons 564a and an elastic member 562a sandwiched between the two buttons 564a. Each button 564a includes a body 5642a and a protrusion 5646a. The protrusion 5646a perpendicularly extends from the body 5642a and is exposed from one of the first positioning through holes 522a. The diameter of the protrusion 5646a is smaller than that of the body 5642a to form a step surface 5644a on the body 5642a of each button 564a. The step surface 5644a abuts against an inner surface 524a of the first sleeve 52a by elasticity of the elastic member 562a.

When the first supporting assembly 50a needs to be adjusted, the buttons 564a are depressed until each protrusion 5646a is totally retracted from the first positioning through hole 522a. The elastic member 562a is further compressed. The first connector 54a is manually moved along the first direction X until the protrusion 5646a meets another first positioning through hole 522a. The protrusion 5646a is inserted into the another first positioning through hole 522a and extending out therefrom by restoration of the elastic member 562a. Therefore, the first connector 54a is held by the first sleeve 52a again.

The structure of the second stopper 76a is similar to that of the first stopper 56a, and an adjustment of the second supporting assembly 70a is similar to that of the first supporting assembly 50a.

Figure 8:
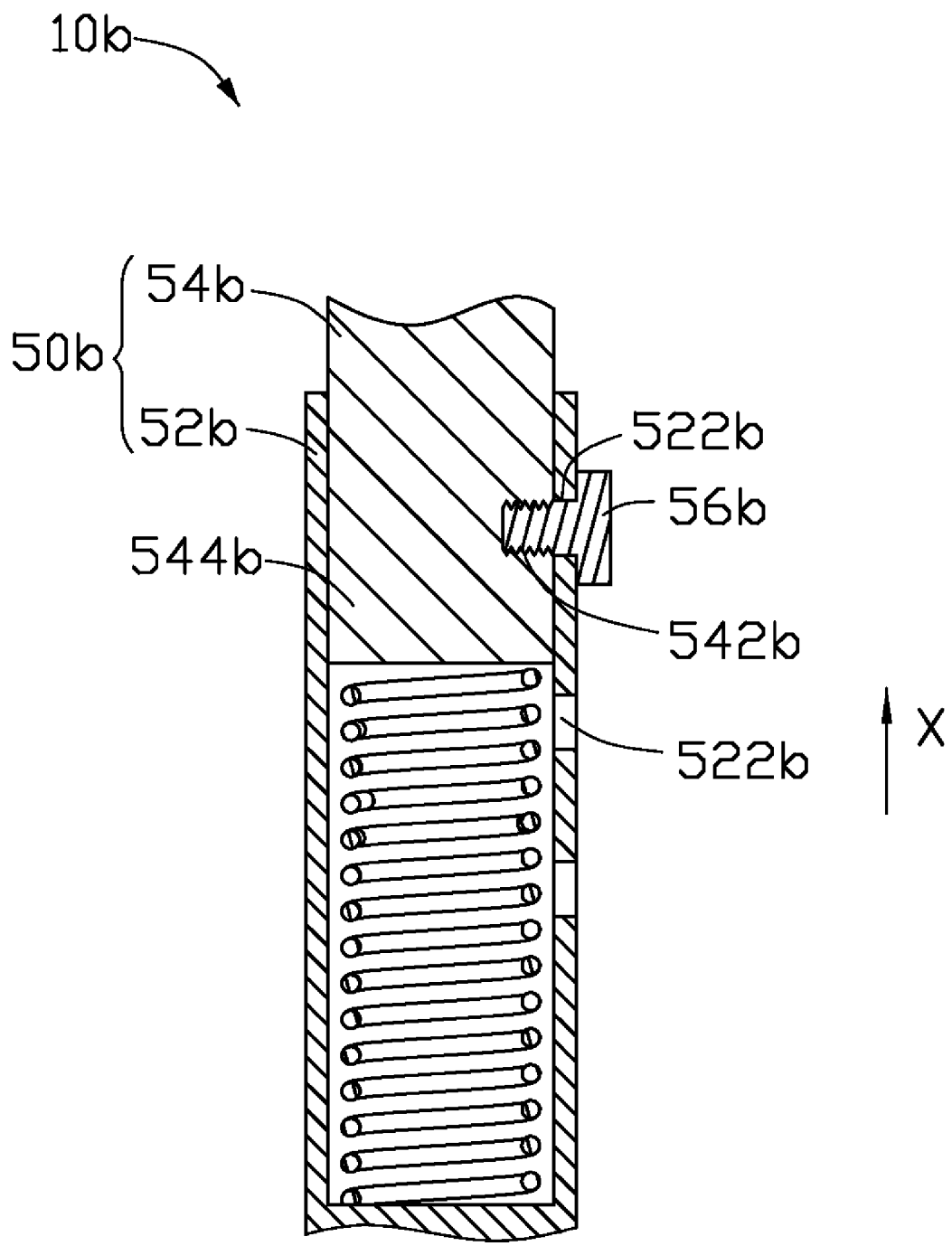
FIG. 8 is a partial cross-sectional view of a support structure of a display device, according to a third exemplary embodiment.
Figure 9:
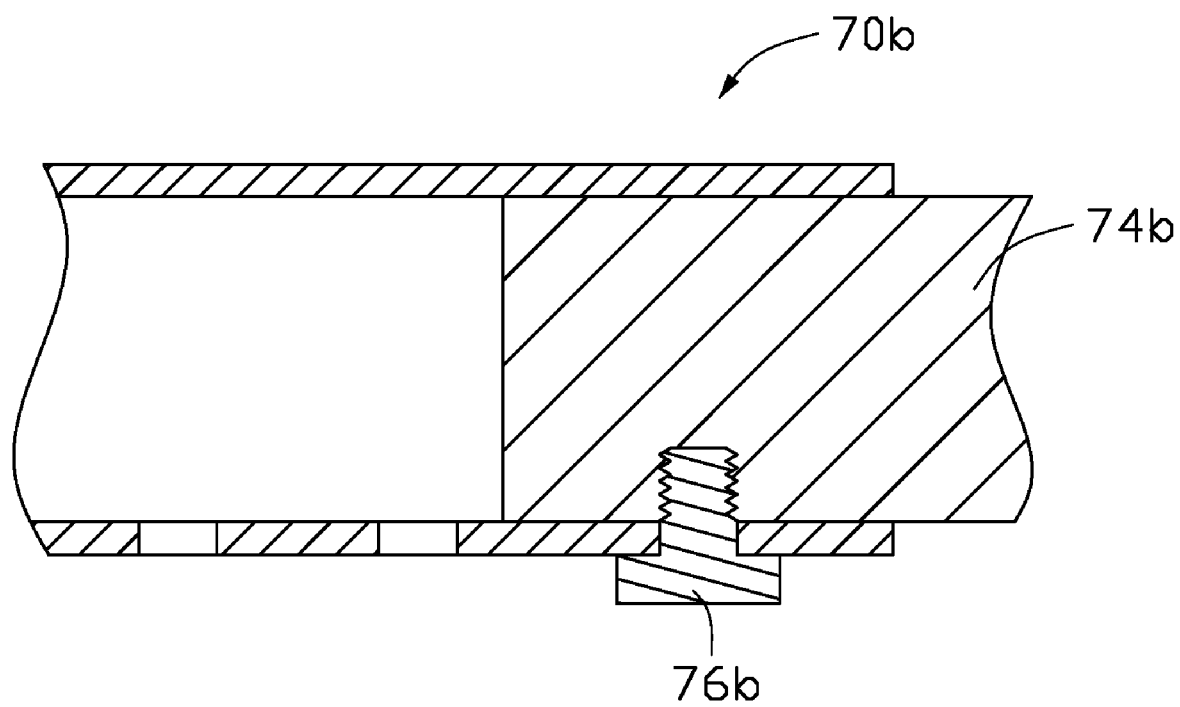
FIG. 9 is another partial cross-sectional view of the support structure of the display device of FIG. 8.

Referring to FIGS. 8-9 together with FIG. 3, a display device 10b according to a third exemplary embodiment is shown. The differences between the display device 10b of this embodiment and the display device 10 are that the first and second stoppers 56b, 76b, and the first and second connectors 54b, 74b of the display device 10b are different.

The first stopper 56b is a bolt. A threaded hole 542b is defined in the distal end 544b of the first connector 54b instead of the through hole. The first stopper 56b is extended through one of the first positioning through holes 522b and is engaged with the first connector 54b via the threaded hole 542b. Therefore, the first connector 54b is coupled to and held by the first sleeve 52b.

When the first supporting assembly 50b needs to be adjusted, the first stopper 56b is loosened from the first connector 54b. The first connector 54b is manually moved along the first direction X until the threaded hole 542b meets another first positioning through hole 522b. The first stopper 54b is extended through the another first positioning through hole 522b and is engaged with the first connector 54b again via the threaded hole 542b. Therefore, the first connector 54b is held by the first sleeve 52b again.

The structures of the second stopper 76b and the second connector 74b are similar to those of the first stopper 56b and the first connector 54b, and adjustment of the second supporting assembly 70b is similar to that of the first supporting assembly 50b.

Advantages of the second and third exemplary embodiments are similar to those of the first exemplary embodiment.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A support structure for supporting a display panel, comprising:
a rotatable base;
a first supporting assembly comprising a first sleeve and a first connector moveably coupled to the first sleeve along a first direction, the first sleeve fixed to the rotatable base;
a second supporting assembly comprising a second sleeve and a second connector moveably coupled to the second sleeve along a second direction, the second direction being perpendicular to the first direction, the second connector slidably coupled to the display panel along a third direction, the third direction perpendicular to a plane cooperatively defined by the first direction and the second direction; and
a connecting portion fixedly connecting the first connector to the second sleeve.

2. The support structure as claimed in claim 1, further comprising a suction cup, wherein the rotatable base comprises a bottom surface and a plurality of wheels, a receiving cavity defined in the bottom surface for rotatably receiving the suction cup, the plurality of wheels installed around the receiving cavity and coplanar with the suction cup.

3. The support structure as claimed in claim 1, wherein the first supporting assembly further comprises a first stopper; a plurality of first positioning through holes are defined through the first sleeve along the first direction; a first through hole is defined in a distal end of the first connector; the first stopper is extended through the first through hole and one of the first positioning through holes so that the first connector is held by the first sleeve.

4. The support structure as claimed in claim 3, wherein the first stopper is rod-shaped.

5. The support structure as claimed in claim 3, wherein the first stopper comprises two buttons and an elastic member sandwiched between the two buttons; each button includes a body and a protrusion perpendicularly extending from the body and exposed from one of the first positioning through holes; a step surface is formed on the body of each button and abuts against an inner wall of the first sleeve by elasticity of the elastic member.

6. The support structure as claimed in claim 1, wherein the first supporting assembly further comprises a bolt; a plurality of first positioning through holes are defined through the first sleeve along the first direction; a threaded hole is defined in a distal end of the first connector; the bolt is extended through one of the first positioning through holes and is engaged with the first connector via the threaded hole so that the first connector is held by the first sleeve.

7. The support structure as claimed in claim 1, wherein the second supporting assembly further comprises a second stopper; a plurality of second positioning through holes are defined through the second sleeve along the second direction; a second through hole is defined in a distal end of the second connector; the second stopper is extended through the second through hole and one of the second positioning through holes so that the second connector is held by the second sleeve.

8. The support structure as claimed in claim 7, wherein the second stopper is rod-shaped.

9. The support structure as claimed in claim 7, wherein the second stopper comprises two buttons and an elastic member sandwiched between the two buttons; each button includes a body and a protrusion perpendicularly extending from the body and exposed from one of the second positioning through holes; a step surface is formed on the body of each button and abuts against an inner wall of the second sleeve by elasticity of the elastic member.

10. The support structure as claimed in claim 7, wherein the second connector comprises a guiding member at an end of the second connector opposite to the distal end of the second connector, the guiding member slidably coupled to the display panel along the third direction.

11. The support structure as claimed in claim 1, wherein the second supporting assembly further comprises a bolt; a plurality of second positioning through holes are defined through the second sleeve along the second direction; a threaded hole is defined in a distal end of the second connector; the bolt is extended through one of the second positioning through holes and is engaged with the second connector via the threaded hole so that the second connector is held by the second sleeve.

12. The support structure as claimed in claim 1, wherein the first supporting assembly further comprises an elastic member received in the first sleeve, the elastic member being abutting again the distal end of the first connector.

13. A display device comprising:
a display panel; and
a support structure, the support structure comprising:
   a rotatable base;
   a first supporting assembly comprising a first sleeve and a first connector moveably coupled to the first sleeve along a first direction, the first sleeve fixed to the rotatable base;
   a second supporting assembly comprising a second sleeve and a second connector moveably coupled to the second sleeve along a second direction, the second direction perpendicular to the first direction, the second connector slidably coupled to the display panel along a third direction, the third direction perpendicular to a plane cooperatively defined by the first direction and the second direction; and
   a connecting portion fixedly connecting the first connector to the second sleeve.

14. The display device as claimed in claim 13, further comprising a suction cup, wherein the rotatable base comprises a bottom surface and a plurality of wheels, a receiving cavity defined in the bottom surface for rotatably receiving the suction cup, the plurality of wheels installed around the receiving cavity and coplanar with the suction cup.

15. The display device as claimed in claim 13, wherein the first supporting assembly further comprises a first stopper; a plurality of first positioning through holes are defined through the first sleeve along the first direction; a first through hole is defined in a distal end of the first connector; the first stopper is extended through the first through hole and one of the first positioning through holes so that the first connector is held by the first sleeve.

16. The display device as claimed in claim 15, wherein the first stopper comprises two buttons and an elastic member sandwiched between the two buttons; each button includes a body and a protrusion perpendicularly extending from the body and exposed from one of the first positioning through holes; a step surface is formed on the body of each button and abuts against an inner wall of the first sleeve by elasticity of the elastic member.

17. The display device as claimed in claim 13, wherein the first supporting assembly further comprises a bolt; a plurality of first positioning through holes are defined through the first sleeve along the first direction; a threaded hole is defined in a distal end of the first connector; the bolt is extended through one of the first positioning through holes and is engaged with the first connector via the threaded hole so that the first connector is held by the first sleeve.

18. The display device as claimed in claim 13, wherein the second supporting assembly further comprises a second stopper; a plurality of second positioning through holes are defined through the second sleeve along the second direction; a second through hole is defined in a distal end of the second connector; the second stopper is extended through the second through hole and one of the second positioning through holes so that the second connector is held by the second sleeve.

19. The display device as claimed in claim 18, wherein the second stopper comprises two buttons and an elastic member sandwiched between the two buttons; each button includes a body and a protrusion perpendicularly extending from the body and exposed from the second positioning through hole; a step surface is formed on the body of each button and abuts against an inner wall of the second sleeve by elasticity of the elastic member.

20. The display device as claimed in claim 19, wherein the second connector comprises a guiding member at an end of the second connector opposite to the distal end of the second connector; a guiding groove is defined at a rear of the display panel along the third direction; the guiding member is slidably coupled to the display panel along the third direction via the guiding groove.

* * * * *